UNITED STATES PATENT OFFICE.

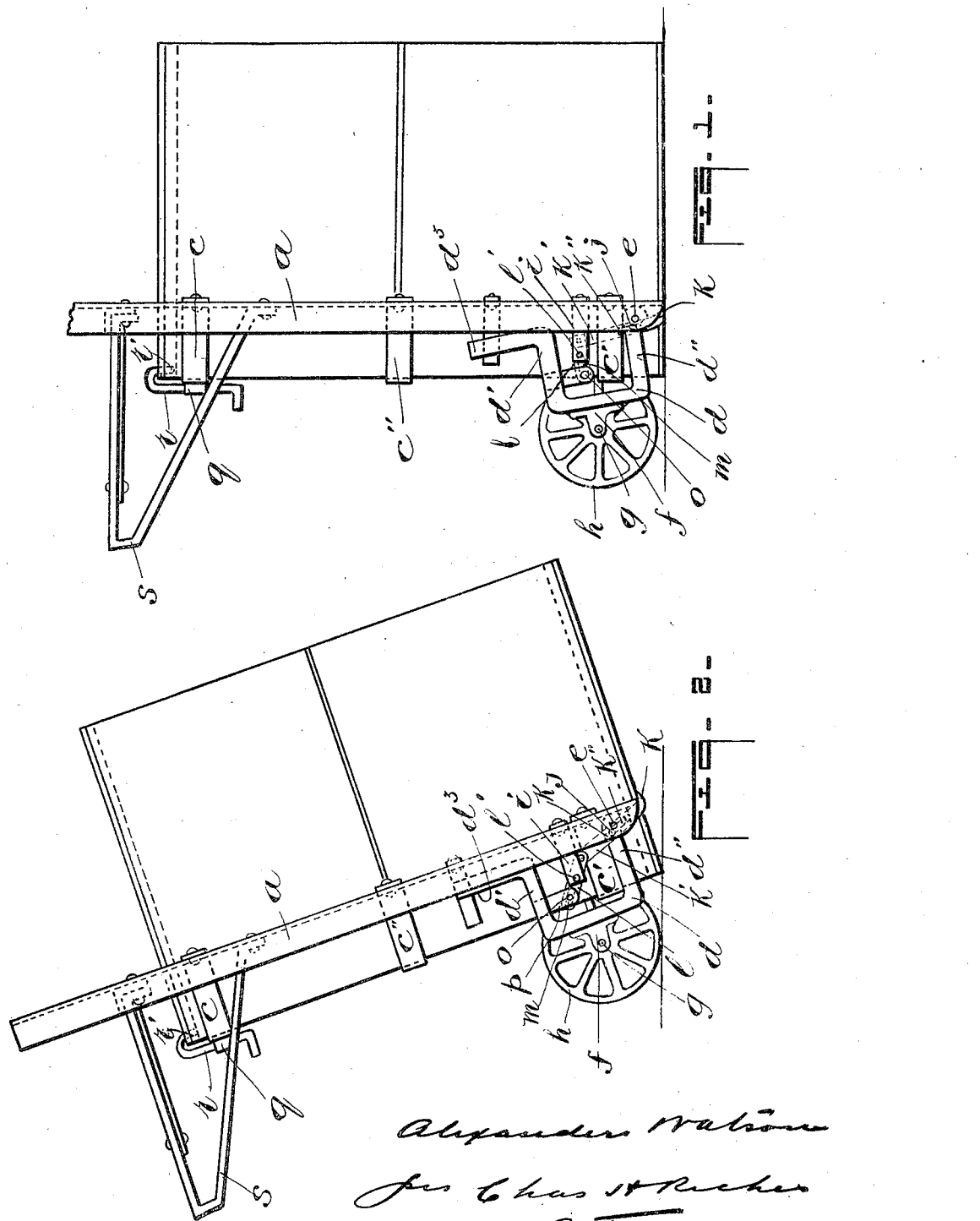

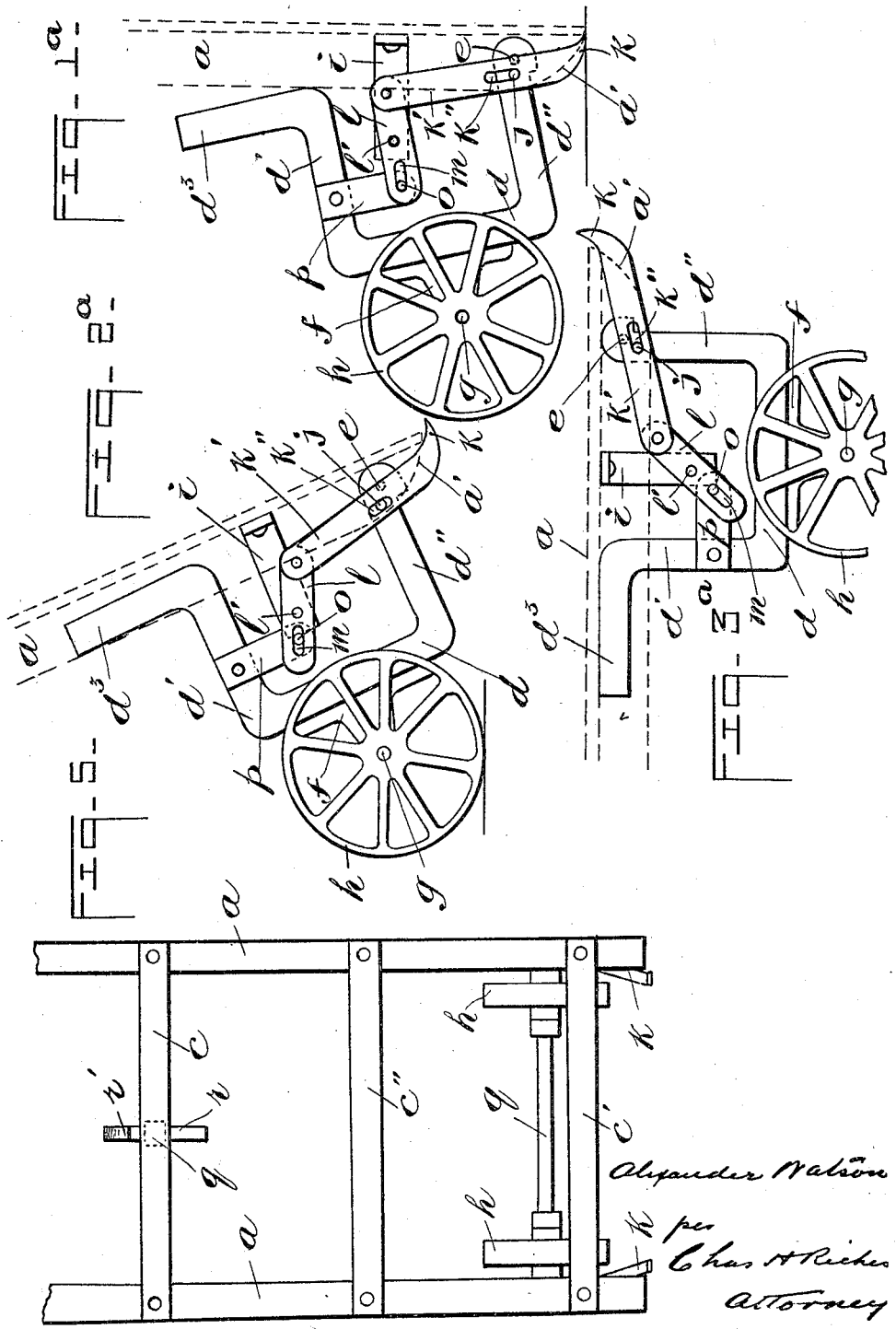

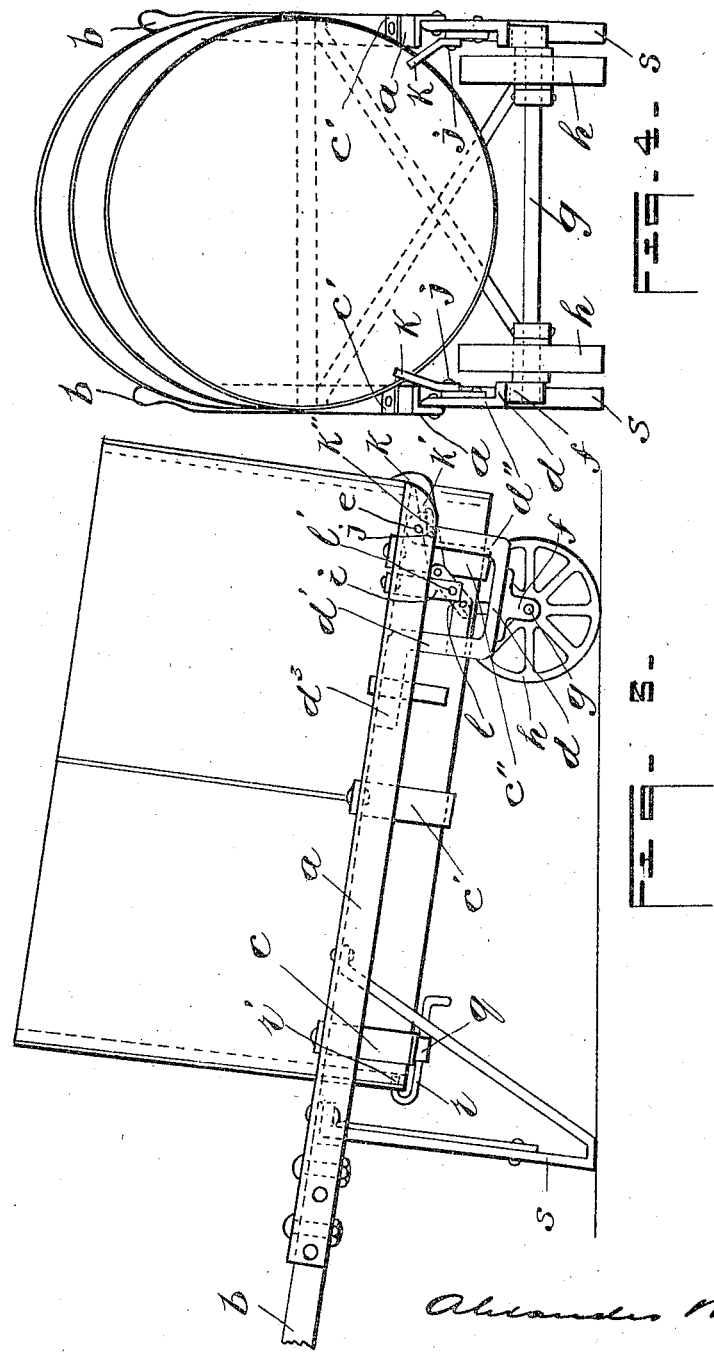

ALEXANDER WATSON, OF TORONTO, ONTARIO, CANADA.

TRUCK.

1,419,184.

Specification of Letters Patent. Patented June 13, 1922.

Application filed December 22, 1920. Serial No. 432,593.

*To all whom it may concern:*

Be it known that I, ALEXANDER WATSON, of the city of Toronto, in the county of York and Province of Ontario, Dominion of Canada, have invented certain new and useful Improvements in Trucks; and I hereby declare that the following is a full, clear, and exact description of the same.

Heretofore in the handling of heavy articles, such as barrels, drums, and other containers, filled with liquid, and closely packed in warehouses, it usually required at least two, and frequently three, and sometimes four, men to effect the loading of the truck owing to the weight and bulk of each container. To devise a truck by which one man can expeditiously and conveniently handle and load such articles is the object of the present invention, which is attained by so constructing it that the frame containing the cradle for the container can be placed in a vertical position close to the article to be handled, and when so placed it will automatically seize it and secure it in position in the cradle; the truck for this purpose being provided with oscillating toes and wheels oscillatingly journalled to the frame to actuate the grapnels or claws to recede from the load, when the truck is in a perpendicular position, and to move towards the load when it is being lowered towards the horizontal, and engage it and securely hold it on the cradle, as hereinafter set forth and particularly pointed out in the claims.

In the drawings:

Fig. 1, is a side elevation of the truck placed in a perpendicular position to receive the load, Fig. 1ª is a detail view of the movable parts in the same position as Fig. 1.

Fig. 2, is a similar view showing the truck being lowered towards the horizontal, Fig. 2ª is a detail view of the movable parts in the same position as Fig. 2.

Fig. 3, is a view similar to the preceding figures, showing the truck in the load carrying position, Fig. 3ª is a detail view of the movable parts in the same position as Fig. 3.

Fig. 4, is an end elevation, and

Fig. 5, is a plan view of the truck with the parts in the position shown in Fig. 3.

Like characters of reference refer to like parts throughout the specification and drawings.

In the preferred construction the truck includes in its structure a frame consisting of two angle iron side bars $a$, $a$, slightly rounded or beveled at one end $a'$ to avoid injury to the surface on which it is standing when in a perpendicular position and when being lowered towards the horizontal and provided at the other end with handles $b$, $b$, for its manipulation.

Bolted or riveted to the side bars are three cross pieces $c$, $c'$, $c''$, the top or load carrying surfaces of which are concaved or curved; the cross piece $c$ being secured to the side bars near the handles $b$, $b$; the cross piece $c'$ near the rounded or bevelled ends $a'$, and the cross piece $c''$ intermediate the cross pieces $c$, $c'$; these cross pieces in conjunction with the side bars forming a cradle for the articles to be carried by the truck.

Pivoted to the side bars near the ends $a'$ are substantially U-shaped bearing brackets $d$, each consisting of two upwardly extending arms $d'$, $d''$. The arms $d''$ are located near the ends $a'$ and are oscillatingly connected to the side bars by pivots $e$ on which the bearing brackets rock, the upper end of each of the arms $d''$ being curved or rounded to form a rolling contact with the under surface of its respective side bar when oscillating on its pivot.

The top of the other arm $d'$ of each bearing bracket has an offset $d^3$, which engages the under surface of its respective side bar when the bearing bracket is in the load carrying position. Bolted to the under surface of each bearing bracket is a bearing $f$, in which is journalled the axle $g$, and mounted on the axle are wheels $h$.

Riveted or otherwise fastened to each side bar is a plate or arm $i$, located intermediate the arms $d'$, $d''$. Extending from each arm $d''$ is a pivot pin $j$, on which is slidingly and rockably mounted the shank $k'$ of a holding member or toe $k$, each shank $k'$ being formed with an elongated slot $k''$ through which the pivot pin passes, and each toe, in the load holding position, extending beyond the end $a'$, and above the top surface, of its respective side bar.

Each shank extends towards the the plate or arm $i$, and is jointed to one end of a lever $l$ fulcrumed to the plate or arm $i$, the fulcrum $l'$ being intermediate its ends. The other end of the lever $l$ is provided with an elongated slot $m$, through which extends a pin $o$, projecting from a lug or plate $p$, forming part of or secured to the arm $d'$.

When the frame of the truck is turned to a perpendicular position the bearing brackets oscillate on their pivotal connection with the side bars $a$, and the bearing brackets and the wheels and their related parts then move into the position shown in Fig. 1. During this movement the pin $o$, travelling in the slot $m$, rocks the lever on its fulcrum, and the lever by its jointed connection with the shank $k'$ rocks the toe on its pivot to bring its point within the plane of the top surface of the side bars and causes it to slide on its pivot in the direction of the plate or arm $i$, thereby bringing its point wholly within the end $a'$ of the frame as shown in Fig. 1.

On the under surface of the curved cross piece $c$ is a slideway $q$ and lengthwise movable through the slideway is a gripping hook $r$. The point $r'$ of this gripping hook, when the frame of the truck is perpendicular, is raised above the edge of the barrel or drum and then lowered to grip the inner surface of its rim. In this position the ends $a'$ of the side bars rest upon the surface on which the load is standing with the truck wheels entirely clear of the surface. When the truck is being lowered towards the horizontal position the hook $r$ draws the load to the slightly inclined position shown in Fig. 2, before the truck wheels come into contact with the surface on which the load is standing.

When the truck wheels engage this surface they cause the bearing brackets to oscillate towards the position shown in Fig. 3, and actuate the lever $l$ to force the toes outward, above and beyond the end of the side bars and into engagement with the corresponding end of the load, the toes then in conjunction with the gripping hook holding the load securely on the cradle. By this construction it is possible for one man, without assistance, to load a barrel or drum on the truck, and without having to shift it from its original storage position irrespective of its weight or size.

Bolted or otherwise secured to the side bars near the handle end are legs or rests $s$ to support the truck and its load when in the position shown in Fig. 3.

To discharge the load the truck and its load are turned to the perpendicular position shown in Fig. 1. When the side bars come into contact with the surface the movable parts oscillate to retract the toes, and when the hook $r$ is lifted above the edge of the load the truck can be wheeled away from it.

Having thus fully described my invention, what I claim as new and desire to secure by Letters Patent is:

1. A truck comprising a frame, truck wheels oscillatingly journalled thereto, and an adjustable load engaging toe located at the extreme end of the frame and actuated by the oscillation of the wheels to move to and from the load engaging position.

2. A truck comprising a frame, truck wheel bearing brackets oscillatingly connected thereto, and adjustable load engaging toes located at the extreme end of the frame and connected with the bearing brackets and actuated by their oscillation to move to and from the load engaging position.

3. A truck comprising a frame, a load engaging toe located at the extreme end of the frame and pivotally connected thereto, and truck wheel bearing brackets oscillatingly connected to the frame and having a sliding connection with the load engaging toe to move the latter to and from the load engaging position during the oscillation of the bearing brackets.

4. A truck comprising a frame consisting of a pair of side bars having handles at one end thereof, a load gripping toe pivoted to each side bar and projecting beyond the other end, a lever fulcrumed to each side bar and jointed to its respective toe, and a truck wheel bearing bracket oscillatingly pivoted to each side bar and actuating its corresponding lever to move its corresponding toe within or beyond the extreme end of the frame during the oscillation of the bearing brackets.

5. A truck comprising a frame consisting of a pair of side bars, having handles at one end thereof, a load gripping toe pivoted to each side bar near the other end, each toe having an elongated shank, a lever jointed at one end to each toe and fulcrumed to the frame, each of said levers having an elongated slot near the other end, a truck wheel bearing bracket oscillatingly pivoted to each side of the frame, a pin movable with each bearing bracket slidable in the slot of its respective toe, an axle journalled in said bearing brackets, and wheels mounted upon said axle and oscillating with the bearing brackets to move the toes to and from the load engaging position.

6. A truck comprising a frame, wheels oscillatingly journalled thereto, an adjustable load engaging toe located at the extreme end of the frame and actuated by the oscillation of the wheels to move to and from the load engaging position, and adjustable gripping means at the opposite end cooperating with the load engaging toe.

7. A truck comprising a frame, wheels oscillatingly journalled thereto, an adjustable toe located at the extreme end of the frame and actuated by the oscillation of the wheels to move to and from the load engaging position, and adjustable gripping means at the opposite end cooperating with the adjustable toe.

8. A truck comprising a frame consisting of a pair of side bars having handles at one end thereof, a load gripping toe pivoted to each side bar near the other end, each toe having an elongated shank, a lever jointed at one end to each toe and fulcrumed to the frame, each of said levers having an elongated slot near the other end, a truck wheel bearing bracket oscillatingly pivoted to each side of the frame, a pin movable with each bearing bracket slidable in the slot of its respective lever and actuating it to move the toe to and from the load engaging position, an axle connected to and oscillating with said bearing brackets, and wheels mounted upon said axle.

Toronto, Ontario, November 29th, 1920.

ALEXANDER WATSON.

Signed in the presence of—
CHARLES H. RICHES,
EDWARD W. BERNSTEIN.